(12) United States Patent
Sulyok et al.

(10) Patent No.: US 8,635,163 B2
(45) Date of Patent: Jan. 21, 2014

(54) SYSTEM AND METHOD FOR FACILITATING A VIDEO GAME EXCHANGE

(75) Inventors: Paul Sulyok, Buckinghamshire (GB); Lee Packham, London (GB)

(73) Assignee: Green Man Gaming Limited, London (GB)

( * ) Notice: Subject to any disclaimer, the term of this patent is extended or adjusted under 35 U.S.C. 154(b) by 16 days.

(21) Appl. No.: 12/915,800

(22) Filed: Oct. 29, 2010

(65) Prior Publication Data

US 2011/0172007 A1    Jul. 14, 2011

Related U.S. Application Data

(60) Provisional application No. 61/294,605, filed on Jan. 13, 2010.

(51) Int. Cl.
   *G06Q 20/00* (2012.01)
(52) U.S. Cl.
   USPC ............... 705/59; 463/29; 463/42; 705/51
(58) Field of Classification Search
   USPC .................. 705/51, 52, 59; 463/25, 29
   See application file for complete search history.

(56) References Cited

U.S. PATENT DOCUMENTS

| | | | | |
|---|---|---|---|---|
| 5,715,403 A | * | 2/1998 | Stefik | 705/44 |
| 5,768,382 A | * | 6/1998 | Schneier et al. | 380/251 |
| 5,970,143 A | * | 10/1999 | Schneier et al. | 713/181 |
| 6,402,614 B1 | * | 6/2002 | Schneier et al. | 463/17 |
| 6,508,709 B1 | * | 1/2003 | Karmarkar | 463/42 |
| 7,094,154 B2 | * | 8/2006 | Kellerman et al. | 463/42 |
| 7,362,862 B2 | * | 4/2008 | Schneier et al. | 380/251 |
| 7,370,194 B2 | * | 5/2008 | Morais et al. | 713/153 |
| 7,515,718 B2 | * | 4/2009 | Nguyen et al. | 380/278 |
| 7,818,262 B2 | * | 10/2010 | Kavuri et al. | 705/59 |
| 7,878,905 B2 | * | 2/2011 | Weston et al. | 463/39 |
| 8,088,007 B2 | * | 1/2012 | Tabata | 463/42 |
| 8,272,948 B2 | * | 9/2012 | Velu et al. | 463/25 |
| 2002/0006828 A1 | * | 1/2002 | Gerding | 463/46 |
| 2002/0147047 A1 | * | 10/2002 | Letovsky et al. | 463/42 |
| 2003/0131252 A1 | * | 7/2003 | Barton | 713/193 |
| 2003/0154160 A1 | * | 8/2003 | Arndt | 705/37 |
| 2003/0177347 A1 | * | 9/2003 | Schneier et al. | 713/151 |
| 2004/0248635 A1 | * | 12/2004 | Efremov | 463/13 |
| 2006/0046810 A1 | * | 3/2006 | Tabata | 463/9 |
| 2006/0093142 A1 | * | 5/2006 | Schneier et al. | 380/251 |
| 2006/0155597 A1 | * | 7/2006 | Gleason | 705/14 |
| 2006/0200414 A1 | * | 9/2006 | Roberts, Jr. | 705/50 |

(Continued)

*Primary Examiner* — Calvin L Hewitt, II
*Assistant Examiner* — Nancy Loan Le
(74) *Attorney, Agent, or Firm* — The Marbury Law Group, PLLC

(57) ABSTRACT

A system and method for facilitating the exchange of electronic video games. A video game exchange server provides interacts with a gaming device to permit a game user to buy and load a video game onto the gaming device, to play the game on the gaming device and to return the "used" game for credits that may be used to purchase a new or used game. The game exchange server assigns a price to each new game and used game in its inventory. The game exchange server also assigns a value to each game currently stored on the gaming device. The game price and the game value may decline as a function of time or based on other factors (e.g., a new release). The game exchange server also validates that a video game stored on a gaming device is authorized.

20 Claims, 6 Drawing Sheets

(56) References Cited

U.S. PATENT DOCUMENTS

| | | | |
|---|---|---|---|
| 2007/0082738 A1* | 4/2007 | Fickie et al. | 463/42 |
| 2007/0198421 A1* | 8/2007 | Muller et al. | 705/52 |
| 2007/0198422 A1* | 8/2007 | Prahlad et al. | 705/52 |
| 2007/0203846 A1* | 8/2007 | Kavuri et al. | 705/59 |
| 2007/0259709 A1* | 11/2007 | Kelly et al. | 463/20 |
| 2007/0265092 A1* | 11/2007 | Betteridge | 463/42 |
| 2008/0065552 A1* | 3/2008 | Elazar et al. | 705/59 |
| 2010/0069145 A1* | 3/2010 | Velu et al. | 463/25 |

* cited by examiner

SYSTEM AND METHOD FOR FACILITATING A VIDEO GAME EXCHANGE

CROSS REFERENCE TO RELATED APPLICATIONS

This application claims the benefit of Provisional Application No. 61/294,605 filed Jan. 13, 2010. The 61/294,605 application is incorporated by reference herein, in its entirety, for all purposes.

BACKGROUND

The production and sale of video games is a huge business with sales revenue exceeding ten billion dollars annually in the United States alone. The sale of video games does not necessarily translate into revenues for game producers and publishers. A used game may be sold many times before its popularity declines. Publishers do not normally share in the proceeds generated by the legal sale of previously owned ("used") video games.

A significant amount of potential revenue is also siphoned off by the pirating of video games. The video game industry has invested time and resources into developing technologies to counter piracy. Such technological solutions to piracy are generally short-lived. As long as a significant segment of the gaming public believes that video game piracy is a "victimless" crime, the demand for less expensive versions of games will continue to provide incentives for pirates to defeat protection technologies and to produce and sell unauthorized copies of video games.

While convincing gamers to respect the intellectual property rights of game developers and publishers may appear futile, providing gamers an incentive to only purchase authorized copies of video games may be easier, less costly, and even profitable for game IP rights holders.

SUMMARY

Embodiments herein are directed to systems and methods for facilitating a video game exchange.

In an embodiment, a video game exchange server interacts with a gaming device to permit a game user to buy and load a video game onto the gaming device, to play the game on the gaming device and to return the "used" game for credits that may be used to purchase a new or used game. The game exchange server assigns a price to each new game and used game in its inventory. The game exchange server also assigns a value to each game currently stored on the gaming device. The game price and the game value may decline as a function of time or based on other factors (e.g., a new release). The game exchange server also validates that a video game stored on a gaming device is authorized.

In an embodiment, a game user who owns a digital media license may resell that media in a manner similar to the resale of disks in the physical world. Once a user has "sold" the digital media, the user will lose the ability to access it.

In an embodiment, intellectual property originators and commercially related third parties may dynamically generate, control and track license ownership of digital products thereby allowing these parties to benefit from the secondary sale/resale of the digital media.

DETAILED DESCRIPTION

In an embodiment, a video game exchange server interacts with a gaming device to permit a game user to buy and load a video game onto the gaming device, to play the game on the gaming device and to return the "used" game for credits that may be used to purchase a new or used game. The game exchange server assigns a price to each new game and used game in its inventory. The game exchange server also assigns a value to each game currently stored on the gaming device. The game price and the game value may decline as a function of time or based on other factors (e.g., a new release). The game exchange server also validates that a video game stored on a gaming device is authorized.

Figure 1:
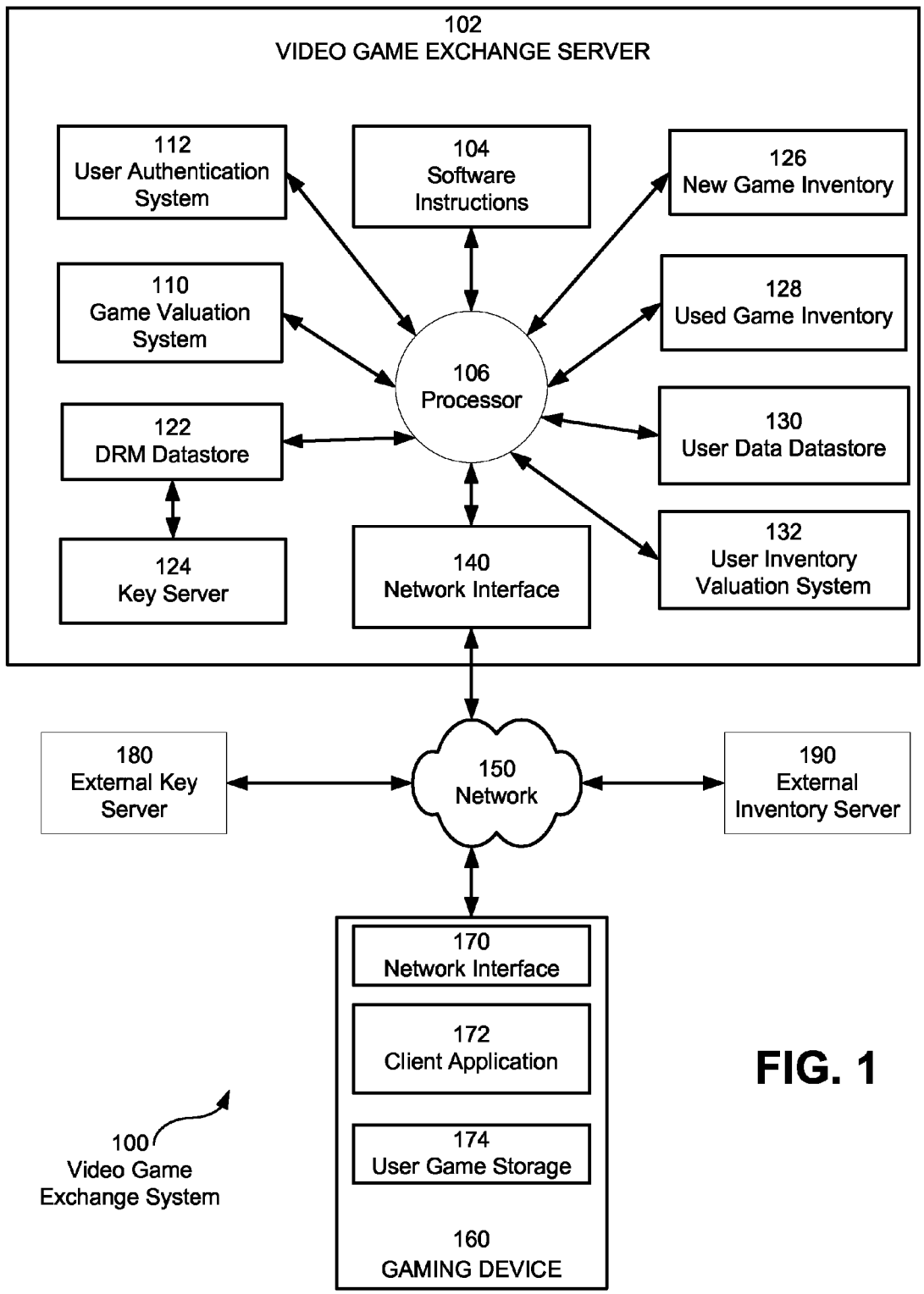
FIG. 1 is a block diagram illustrating a game exchange system according to an embodiment.

FIG. 1 is a block diagram illustrating a game exchange system according to an embodiment.

In embodiment, a game exchange system 100 comprises a video game exchange server 102 and a gaming device 160 in communications via a network 150. Communications are managed via a network interface 140 of the video game server 102 and a network interface 170 of the gaming device 160.

In this embodiment, the game exchange server 102 comprises a processor 106. The processor executes software instructions 104 that cause the processor 106 to perform operations described below.

A gaming device 160 is connected to a network 150 via network interface 170. A gaming device may be a desk top computer, a lap top computer, a hand held computer, a game console, or a mobile gaming platform. A user may establish an account with the video game exchange server 102 by providing information as requested by user authentication system 112. User data is saved in a user data datastore 130. The user's access to the video game exchange server 102 is managed by a user authentication system 112. The user authentication system 112 may acquire data from the user data datastore 130 to authenticate a user and to permit the user to access to the system.

During the registration process, the gaming device 160 may receive a client application 172 that enables the gaming device 160 to interact with the game exchange system 102. An authenticated user may shop the new game inventory 126 and the used game inventory 128 on or accessible to the video game exchange server 102. By way of illustration and not by way of limitation, the software instructions 104 may include a shopping application and a search engine to facilitate a user's acquisition of video games from the new game inventory 126 and the used game inventory 128.

In an embodiment, the new game inventory 126 and the used game inventory 128 are maintained in a datastructure (not illustrated) that permits searching and real-time updating as games are sold and, in the case of the used game inventory 128, returned. The game inventories 126 and 128 may include both a listing of the games for sale and electronic copies of the games. Alternatively, the actual electronic copies may be stored on an external inventory server 190 accessible to the video exchange server 102 via the network interface 140 and the network 150.

The price for a new or a used video game is determined by game valuation system 110. The price of a new game may be established, for example, based on agreements with game publishers, the proximity to release date, the complexity of the game, the popularity of the game and other factors. In an embodiment, the price of a used game may be based on such factors as total new games in circulation, total second hand games in circulation, speed of the last second hand game sold, price of the last second hand game sale, and the number of indications of intent on the game (when available). In an embodiment, game prices may be updated or approved as often as market factors require and data permits.

In an embodiment, a game valuation system 110 utilizes base trading tolerances (BTT) and BTT shift triggers. When a game is first added to the game inventory, BTTs are established for the game. By way of illustration and not by way of limitation, a game may be assigned three variables: (1) a new price (NP), a used price (UP) and a buy back price (BP). A game may be set up with the new price (NP) set as the price driver and the UP and the BP defined in terms of the NP. For example:

$$UP=NP*0.8, and$$

$$BP=UP*0.5$$

In this example, if the new price is $20.00, then the used price is $16.00 and the buy back price is $10.00.

BTT's may be changed with BTT shift triggers. BTT shift triggers may be pre-determined when the game is loaded or established once a game is set on the system. In an embodiment, when trading activity reaches a certain level the BBT may change automatically.

By way of illustration and not by way of limitation, a BTT shift trigger may be a time from release date, a time from another specified date, and a trading volume measure for new and bought back games. Multiple BTT shift triggers may be applied to a particular game. For example, a game may be assigned a set of BTTs "A" with pre-defined pricing relationships. When "X: new games are sold in "Y" time period, a shift trigger is applied to the BTT set "A" and the game pricing shifts to a BTT set "B." BTT set "B" may, for example, slash the price of used games in order to reduce the number of new games that are purchased.

In an embodiment, after a user establishes an account with the video game exchange server 102, the user may purchase a game using traditional payment methods, including for example via a credit card, a debit card, a check, and an electronic fund transfer system. The user may continue to acquire new and used video games using any one of the traditional payment methods. The user gaming device 160 comprises user game storage 174. Games that are purchased by the user may be downloaded to the user game storage 174.

In an embodiment, the game may be subjected to a client-side protection process before the game is stored in user game storage 174. In this embodiment, the protection process may cause the digital version of the game to be unreadable by the user gaming device 160 or by a potential unauthorized user. The client application 172 may remove the protection from the game to render the game readable by the user gaming device and playable by the user.

In an embodiment, the user's personal inventory of video games is saved in the user data datastore 130. A value may be assigned by a user inventory evaluation system 132 to each game in the user's personal inventory. The user may elect to exchange one or more of the video games in the user's personal inventory to purchase a new game listed on the new game inventory 126 and or a used video game from the used game inventory 128. The user will receive the value of the exchanged video games as determined by the user inventory evaluation system 130 at the time the exchange is consummated.

In order to assure that the video games stored on the gaming device 160 are authorized copies of video games obtained from the video game exchange server 102, when a game is purchase by a user of the gaming device 160, the game may be associated with a user account by associating a unique key assigned to the instance of the game that is downloaded to the gaming device 160. The generation and association of the key with the user may be triggered in response to a confirmation that payment for the game (either by a commercial payment instrument or via a value exchange or a combination of both) has been received. The key is associated with the user's account in a data rights management (DRM) datastore 122.

The key may be used to validate the user's rights with respect to a video game under a variety of circumstances. By way of illustration and not by way of limitation, the game key may be used to permit a user to use a game and to exchange electronic copies of games.

The game key validation process may be performed by a client application 172 downloaded to the gaming device 160 during the registration process as previously described. In embodiment, the client application 172 communicates with a data rights management module (not illustrated) that accompanies a copy of a game. The client application 172 communicates with the (DRM) datastore 122 to confirm that the key in the game downloaded by the user of gaming device 160 is the key assigned to the instance of the game associated with the user's account.

The key system may also facilitate the generation of an audit trail and history by associating the original license key with subsequent keys. The key data may also be used to facilitate tracking the users who currently own a particular game, how long a user owned the rights to a game, how often a game was played, and when the game was last played by a particular user. The association of the issued keys with a user's account further facilitates the transfer of the user's personal inventory to a new gaming device 160.

Figure 2:
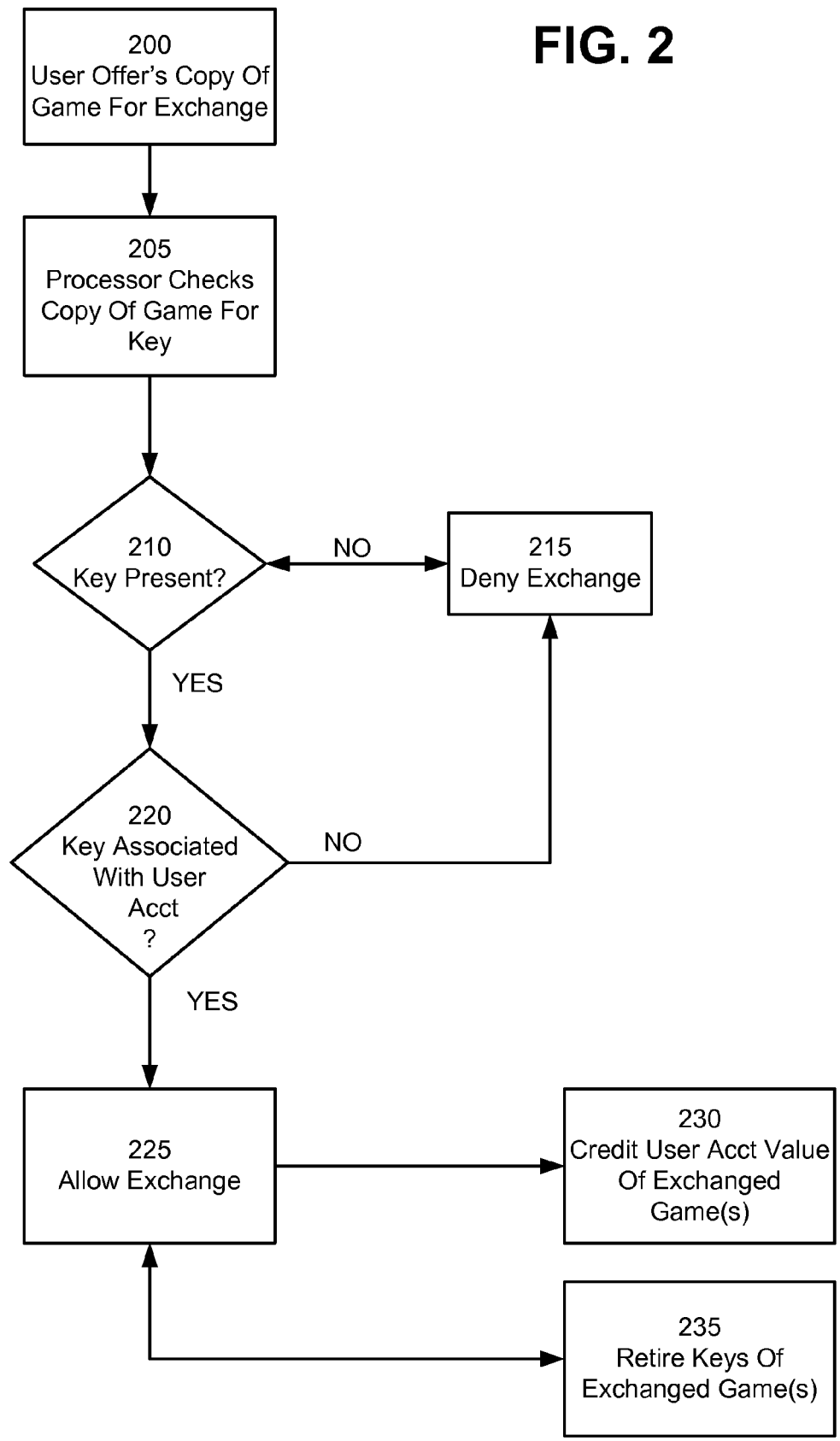
FIG. 2 is a block diagram illustrating a game exchange according to an embodiment.

FIG. 2 is flow diagram illustrating a game exchange according to an embodiment.

In this embodiment, when a user proffers a video game for exchange (block 200), the processor 106 checks the proffered game for the presence of the game key (block 205). If the game key is not found, that is if the decision in block 210 is "NO," then the proffered exchange is refused (block 215). If the game key is found, that is if the decision in block 210 is "YES," the processor 106 checks the user key assignment datastore 122 to determine whether the game key is associated with the user's account (block 220). If the game key is not associated with the user's account, that is if the decision in block 220 is "NO," then the proffered exchange is refused (block 215). If the game key is associated with the user's account, that is if the decision in block 220 is "YES," the processor 106 can be assured that the user is entitled to possess the copy of the game subject to the exchange and allows the exchange to be consummated (block 225). In an embodiment, the user's account is then credited with the value assigned to the exchanged game (block 230). The game keys of each of the exchanged games is retired such that the user may no longer play a game even when a copy of a game remains in the user game storage 174 (block 235).

In an embodiment, a system for exchanging video games comprises a network, a video game exchange server, and a gaming device in communication with the video exchange server via the network. The video game exchange server comprises a processor. The processor receives from the gaming device a request to exchange a digital game identified in a user game inventory for a game not currently identified in the user game inventory. The user game inventory associates an account of a user using the gaming device to one or more digital games to which the user has acquired use rights. The processor assigns a value to the game offered for exchange, determines whether the user of the gaming device has acquired use rights to the digital game offered for exchange, and, when the user of the gaming device has acquired use rights to the digital game offered for exchange, applies the assigned value to the purchase price of the requested game. In an embodiment, the game offered for exchange is removed from the user game inventory. In another embodiment, each digital game is assigned a unique key and removing the game offered for exchange from the user game inventory is accomplished by deleting the key associated with the game offered for exchange.

In an embodiment, the game key may also be used to facilitate the transfer of a user's personal game inventory to another computer. In this embodiment, when a user accesses the game exchange server 102 from a new gaming device, the user may request that the exchange server transfer the games in the user's personal game inventory to the new computer. In this embodiment, the game keys of each of the games on the old computer are retired and new keys issued for each game. The new keys are then associated with the user in the DRM datastore 122.

In an embodiment, a video game exchange system 100 supports a revenue sharing model that extends the revenue opportunity of a game publisher past the first sale to include revenue from "used" games. In this model, the game publisher not only receives a "standard" royalty for new game sales, but receives a percentage of the purchase price of a used game each time it is resold.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

Figure 3:
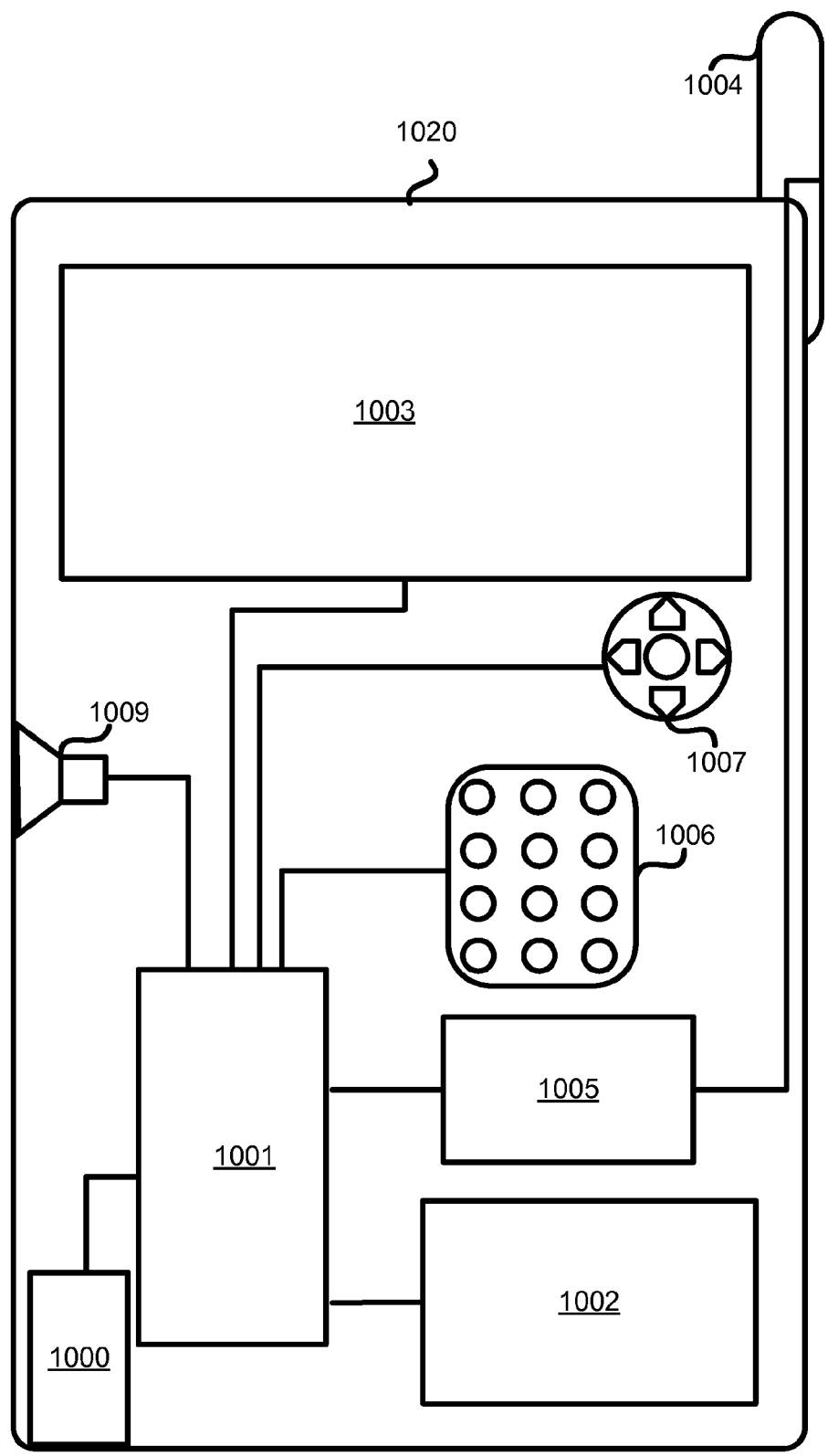
FIG. 3 is a component block diagram illustrating a computing device suitable for use in the various embodiments.

Typical computing devices suitable for use with the various embodiments will have in common the components illustrated in FIG. 3. For example, the exemplary computing device 1020 may include a processor 1001 coupled to internal memory 1002, a display 1003 and to a SIM 1009 or similar removable memory unit. Additionally, the computing device 1020 may have an antenna 1004 for sending and receiving electromagnetic radiation that is connected to a wireless data link and/or cellular telephone transceiver 1005 coupled to the processor 1001. In some implementations, the transceiver 1005 and portions of the processor 1001 and memory 1002 used for cellular telephone communications are collectively referred to as the air interface since it provides a data interface via a wireless data link. Computing devices typically also include a key pad 1006 or miniature keyboard and menu selection buttons or rocker switches 1007 for receiving user inputs. Computing device 1020 may also include a GPS navigation device 1000 coupled to the processor used for determining the location coordinates of the computing device 1020.

The processor 1001 may be any programmable microprocessor, microcomputer or multiple processor chip or chips that can be configured by software instructions (applications) to perform a variety of functions, including the functions of the various embodiments described herein. In some computing devices, multiple processors 1001 may be provided, such as one processor dedicated to wireless communication functions and one processor dedicated to running other applications. Typically, software applications may be stored in the internal memory 1002 before they are accessed and loaded into the processor 1001. In some computing devices, the processor 1001 may include internal memory sufficient to store the application software instructions. The internal memory of the processor may include a secure memory 1008 which is not directly accessible by users or applications and that is capable of recording MDINs and SIM IDs as described in the various embodiments. As part of the processor, such a secure memory 1008 may not be replaced or accessed without damaging or replacing the processor. In some computing devices, additional memory chips (e.g., a Secure Data (SD) card) may be plugged into the device 1020 and coupled to the processor 1001. In many computing devices, the internal memory 1002 may be a volatile or nonvolatile memory, such as flash memory, or a mixture of both. For the purposes of this description, a general reference to memory refers to all memory accessible by the processor 1001, including internal memory 1002, removable memory plugged into the computing device, and memory within the processor 1001 itself, including the secure memory 1008.

Figure 4:
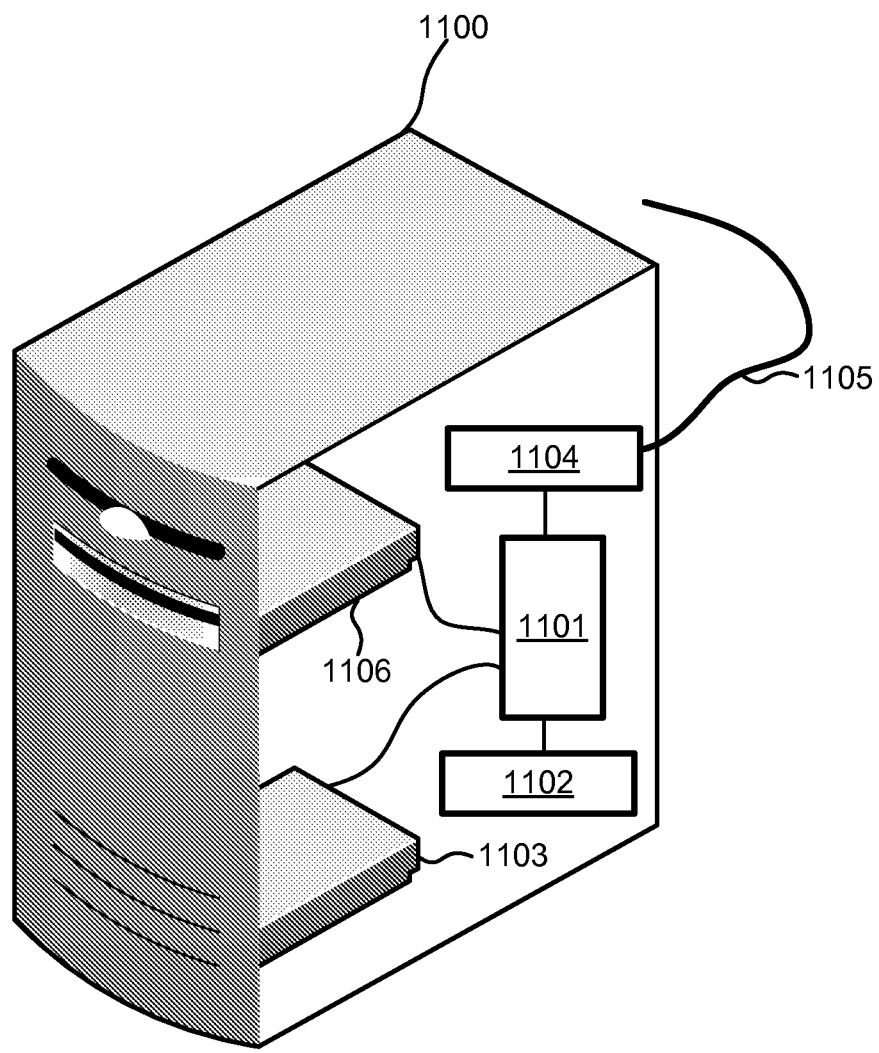
FIG. 4 is a component block diagram illustrating a server device suitable for use in the various embodiments.

A number of the embodiments described above may also be implemented with any of a variety of remote server devices, such as the server 1100 illustrated in FIG. 4. Such a server 1100 typically includes a processor 1101 coupled to volatile memory 1102 and a large capacity nonvolatile memory, such as a disk drive 1103. The server 1100 may also include a floppy disc drive and/or a compact disc (CD) drive 1106 coupled to the processor 1101. The server 1100 may also include network access ports 1104 coupled to the processor 1101 for establishing data connections with network circuits 1105, such as the Internet.

Figure 5:
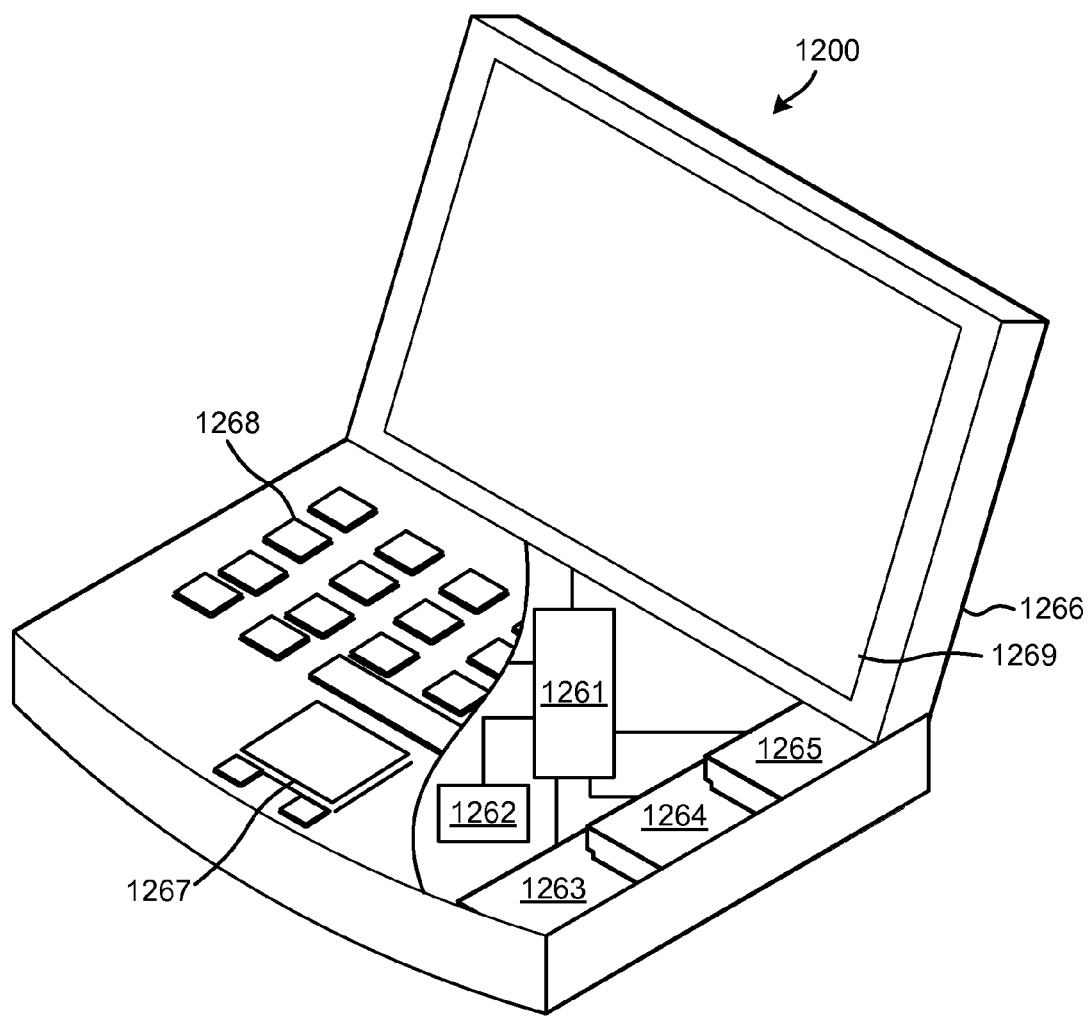
FIG. 5 is a component block diagram illustrating a lap top device suitable for use in the various embodiments.

A number of the aspects described above may also be implemented with any of a variety of computing devices, such as a notebook computer 1200 illustrated in FIG. 5. Such a notebook computer 1200 typically includes a housing 1266 that contains a processor 1261 coupled to volatile memory 1262 and a large capacity nonvolatile memory, such as a disk drive 1263. The computer 1200 may also include a floppy disc drive 1264 and a compact disc (CD) drive 1265 coupled to the processor 1261. The computer housing 1266 typically also includes a touchpad 1267, keyboard 1268 and the display 1269.

Figure 6:
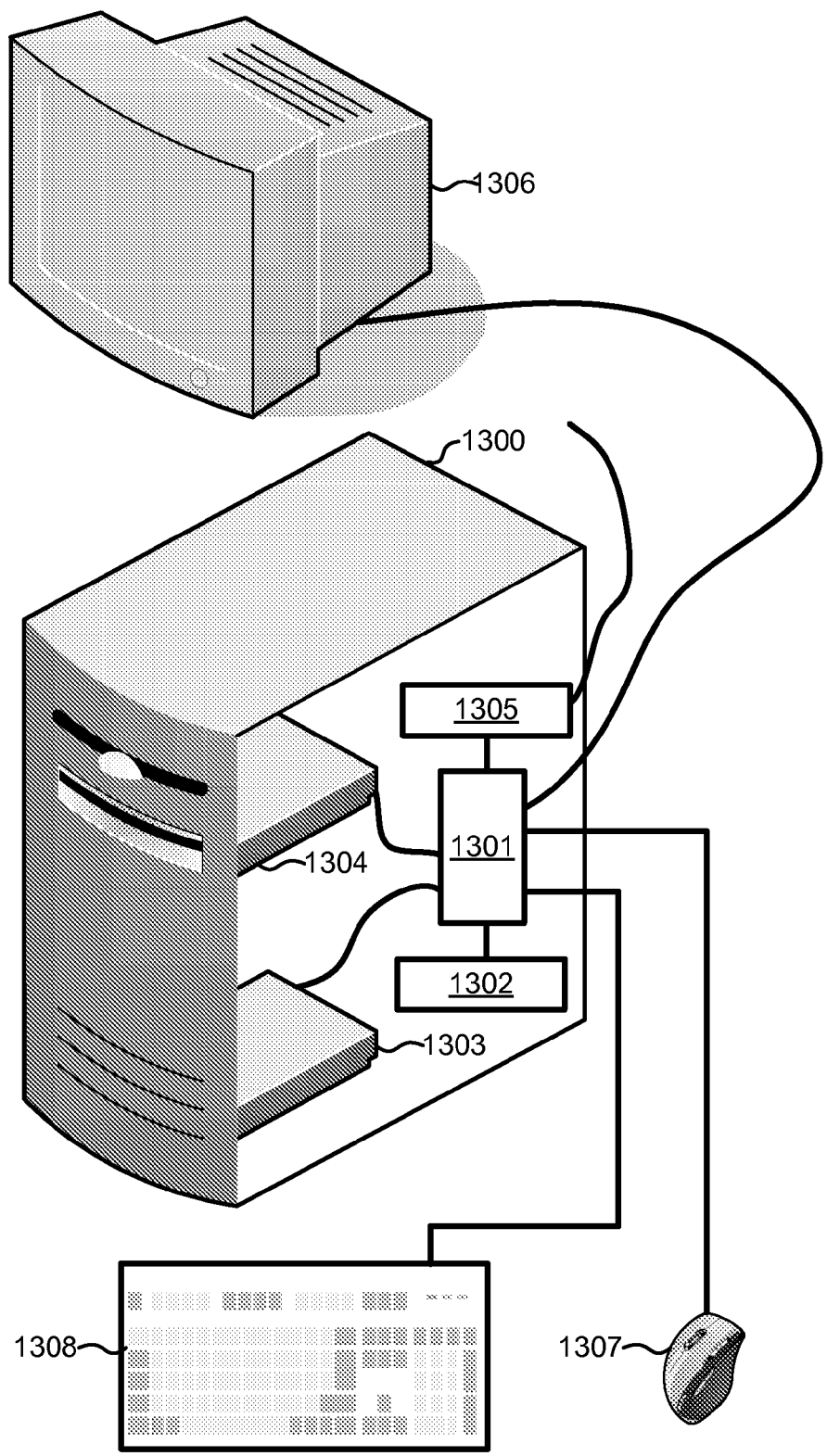
FIG. 6 is a component block diagram illustrating a computer suitable for use in the various embodiments.

The embodiments described above may also be implemented on any of a variety of computers, such as a personal computer 1300 illustrated in FIG. 6. Such a personal computer 1300 typically includes a processor 1301 coupled to volatile memory 1302 and a large capacity nonvolatile memory, such as a disk drive 1303. The computer 1300 may also include a floppy disc drive 1304 and a compact disc (CD) drive 1305 coupled to the processor 1301. Typically the computer 1300 will also include a pointing device such as a mouse 1307, a user input device such as a keyboard 1308 and a display 1308. The computer 1300 may also include a number of network connection circuits 1306, such as a USB or FireWire®, coupled to the processor 1301 for establishing data connections to external devices such as a programmable device being tested. In a notebook configuration, the computer housing includes the pointing device 1307, keyboard 1308 and the display 1309 as is well known in the computer arts.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The blocks of a method or algorithm disclosed herein may be embodied in a processor-executable software module which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the following claims and the principles and novel features disclosed herein.

What is claimed is:

1. A system for exchanging video games comprising:
   a network comprising a plurality of connected computers;
   a video game exchange server;
   a gaming device comprising a first processor in communication with the video exchange server via the network, wherein the first processor is coupled to a memory storing executable instructions that when executed by the first processor cause the first processor to perform operations comprising:
      downloading a client application from the video game exchange server;
      sending, using the client application, a request to the game exchange server to establish an account for the gaming device; and
      sending to the game exchange server using the client application an offer to exchange a digital game for which the gaming device has acquired use rights for a game for which gaming device has not acquired use right, wherein the offer to exchange comprises a first unique key assigned to the game offered for exchange;
   wherein the video game exchange server comprises a second processor and wherein the second processor is coupled to a memory storing executable instructions that when executed by the second processor causes the second processor to perform operations comprising:
      downloading a client application to the gaming device in response to the request from the client application;
      establishing an account for the gaming device in response to the request from the client application;
      receiving from the gaming device via the client application the offer to exchange the digital game;
      confirming from the first unique key that the gaming device has acquired use rights to the digital game offered for exchange;
      accepting the offer to exchange the digital game for which the use rights have been confirmed;
      storing a second unique key associated with the requested game in a datastore;
      retiring the first unique key of the digital game subject to the accepted offer from the datastore.

2. The system of claim 1, wherein the software instruction for confirming from the first unique key that the gaming device has acquired use rights to the digital game offered for exchange comprises determining whether the first unique key associated with the digital game offered for exchange, and communicated by the client application to the video game exchange server in the offer matches a game key associated with the gaming device account.

3. The system of claim 1, wherein the second processor further executes software instructions that cause the second processor to perform operations comprising:
   providing the requested game and the second unique key to gaming device; and
   adding the requested game and the unique key of the requested game to a game inventory associated with the gaming device.

4. The system of claim 1 wherein the second processor further executes software instructions that cause the second processor to perform operations comprising:
   receiving from the gaming device via the client application a request for validation of the digital game offered for exchange, wherein the request for validation comprises the first unique key;
   determining that the first unique key does not match a key in the datastore; and
   sending the gaming device via the client application a refusal to validate the first unique key,
   wherein the digital game offered for exchange is rendered inoperable by the gaming device.

5. The system of claim 3, wherein the second processor further executes software instructions that cause the second processor to perform operations comprising:
   removing the game offered for exchange from the game inventory associated with the gaming device.

6. The system of claim 5, wherein the instruction for removing the game offered for exchange from the game inventory associated with the gaming device comprises deleting the first unique key associated with the game offered for exchange from the game inventory associated with the gaming device.

7. The system of claim 1, wherein the gaming device is selected from the group consisting of a desk top computer, a lap top computer, a hand held computer, a game console, and a mobile gaming platform.

8. A method for exchanging digital video games using a video game exchange server comprising:
   downloading by a gaming device a client application to the gaming device upon request of the gaming device;
   sending a request from the client application to the video exchange server to establish an account for the gaming device;
   establishing an account for the gaming device with a video exchange server in response to the request;
   sending to the game exchange server by the gaming device using the client application an offer to exchange a digital game for which the gaming device has acquired use rights for a game for which gaming device has not acquired use rights, wherein the offer to exchange comprises a first unique key assigned to the game offered for exchange;
   confirming by the video game exchange server from the first unique key that the user of the gaming device has acquired use rights to the digital game offered for exchange;
   accepting by the video game exchange server the offer to exchange the digital game for which the use rights have been confirmed;
   storing by the video game exchange server a second unique key associated with the requested game in a datastore; and
   retiring by the video game exchange server the first unique key of the digital game subject to the accepted offer from the datastore.

9. The method of claim 8, wherein confirming by the video game exchange server from the first unique key that the gaming device has acquired use rights to the digital game offered for exchange comprises determining by the video game exchange server whether the first unique key associated with the digital game offered for exchange matches a game key associated with one or more digital games associated with the game device account.

10. The method of claim 8, wherein the gaming device is selected from the group consisting of a desk top computer, a lap top computer, a hand held computer, a game console, and a mobile gaming platform.

11. The method of claim 8, further comprising:
   providing by the video game exchange server the requested game and the second unique key to the gaming device; and
   adding by the video game exchange server the requested game and the second unique key of the requested game to a game inventory associated with the gaming device.

12. The method of claim 8 further comprising:
   receiving by the video game exchange server from the gaming device via the client application a request for validation of the digital game offered for exchange, wherein the request for validation comprises the first unique key;
   determining by the video game exchange server that the first unique key does not match a key in the datastore; and
   sending by the video game exchange server the gaming device via the client application a refusal to validate the first unique key, wherein the digital game offered for exchange is rendered inoperable by the gaming device.

13. The method of claim 11, further comprising:
   removing by the video game exchange server the game offered for exchange from the game inventory associated with the gaming device.

14. The method of claim 13, wherein removing by the video game exchange server the game offered for exchange from the user game inventory comprises deleting by the video game exchange server the first unique key associated with the game offered for exchange.

15. The system of claim 1, wherein the operation for accepting the offer to exchange the digital game for which the use rights have been confirmed comprises operations for:
   assigning a value to the game offered for exchange;
   confirming that the value of the game offered for exchange exceeds a value of the requested game; and
   accepting the offer to exchange the digital game for which the value has been confirmed.

16. The system of claim 1, wherein the operation for accepting the offer to exchange the digital game for which the use rights have been confirmed comprises operations for:
   assigning a value to the game offered for exchange;
   determining a value of credits associated with the account;
   confirming that the value of the game offered for exchange in combination with the value of the credits associated with the account exceeds a value of the requested game; and
   accepting the offer to exchange the digital game for which the value has been confirmed.

17. The system of claim 15, wherein the operation for assigning a value to the game offered for exchange comprises:
   determining a value of the game offered for exchange using at least one of an agreements with a game publisher, a the date of the offer relative to a date the game offered for exchange was release, a measure of complexity of the game offered for exchange, a measure of popularity of the game offered for exchange, a number of copies of the game offered for exchange in circulation, a number of other copies of the game offered for exchange available for exchange, an amount of time required to sell a last copy of the game offered for exchange, a price of a last copy of the game offered for exchange to be sold, and a number of requests for the game offered for exchange.

18. The method of claim 8, wherein accepting the offer to exchange the digital game for which the use rights have been confirmed comprises:
   assigning by the video game exchange server a value to the game offered for exchange;
   confirming by the video game exchange server that the value of the game offered for exchange exceeds a value of the requested game; and
   accepting by the video game exchange server the offer to exchange the digital game for which the value has been confirmed.

19. The method of claim 8, wherein accepting the offer to exchange the digital game for which the use rights have been confirmed comprises:
   assigning by the video game exchange server a value to the game offered for exchange;
   determining by the video game exchange server a value of credits associated with the account;
   confirming by the video game exchange server that the value of the game offered for exchange in combination with the value of the credits associated with the account exceeds a value of the requested game; and
   accepting by the video game exchange server the offer to exchange the digital game for which the value has been confirmed.

20. The method of claim 18, wherein assigning a value to the game offered for exchange comprises determining a value of the game offered for exchange using at least one of an agreement with a game publisher, a the date of the offer relative to a date the game offered for exchange was released, a measure of complexity of the game offered for exchange, a measure of popularity of the game offered for exchange, a number of copies of the game offered for exchange in circulation, a number of other copies of the game offered for exchange available for exchange, an amount of time required to sell a last copy of the game offered for exchange, a price of a last copy of the game offered for exchange to be sold, and a number of requests for the game offered for exchange.

* * * * *